United States Patent [19]

Tsukada

[11] Patent Number: 4,886,375
[45] Date of Patent: Dec. 12, 1989

[54] DUST-PROOF COVER FOR LINEAR GUIDE

[75] Inventor: Toru Tsukada, Gumma, Japan

[73] Assignee: Nippon Seiko Kabushiki Kaisha, Tokyo, Japan

[21] Appl. No.: 320,982

[22] Filed: Mar. 9, 1989

[30] Foreign Application Priority Data

Mar. 9, 1988 [JP] Japan ............................. 63-31442[U]

[51] Int. Cl.⁴ ............................................ F16C 29/06
[52] U.S. Cl. .......................................... 384/15; 384/45
[58] Field of Search ................... 384/15, 16, 45, 43, 384/44; 464/168

[56] References Cited

U.S. PATENT DOCUMENTS 4,522,246 6/1985 Bierbrauer et al. .................. 384/15
4,676,666 6/1987 Pflüger et al. ........................ 384/15
4,778,284 10/1988 Teremachi ............................. 384/45

FOREIGN PATENT DOCUMENTS 6061139 4/1985 Japan .

Primary Examiner—Lenard A. Footland
Attorney, Agent, or Firm—Basile and Hanlon

[57] ABSTRACT

A dust-proof cover for preventing foreign particles from attaching or depositing on the surface of a guide rail of a linear guide apparatus includes, for example, four hollow-square cover elements connected telescopically. The dust-proof cover has an open bottom portion with edge portions extending axially and extending inwardly from both lower edges of the side walls of the dust-proof cover. Two of the cover elements respectively have pairs of sphere members held rollably in the inside of both side edge portions so that the pairs of sphere members protrude inwardly into ball rolling grooves formed in both sides of the guide rail. The dust-proof cover can be extended and contracted smoothly by being guided by the pairs of sphere members rolling in the ball rolling grooves.

2 Claims, 3 Drawing Sheets

DUST-PROOF COVER FOR LINEAR GUIDE

BACKGROUND OF THE INVENTION

1. Field of the Invention

The present invention relates to a dust-proof cover which is telescopic for preventing foreign particles, such as chips of cutting and cutting oil, from attaching to the surface of a guide rail of a linear guide apparatus.

2. Description of the Prior Art

A prior art linear guide apparatus 1, as shown in FIG. 10, includes an elongate guide rail 3 having axially extending ball rolling grooves 2 formed in both side surfaces thereof. A slider 4 is mounted on the guide rail 1 and contains a plurality of rolling balls for infinite circulation therein, so that the slider 4 is axially movable along the guide rail 3 through rolling action of the balls which roll along the ball rolling grooves 2.

The guide rail 3 is fixed, for example, to the base of a machine tool, a robot, instrumentation equipment, or a precision positioning table by screws which are inserted through fixing bolt holes 5. On the other hand, in the case of the machine tool, a member to be driven, such as a cutter holder is similarly fixed to the slider 4. Thus, the member to be driven is moved linearly along the guide rail 3 with the movement of the slider 4.

However, when a particularly accurate linear movement is required, if foreign particles such as dust, powders produced in welding, cutting oil or the like attach to the upper surface 3a of the guide rail 3 or to the ball rolling grooves 2, and subsequently enter into the inside of the slider 4, the smooth rolling of the rolling balls will be disturbed and the desired accuracy will not be insured. Furthermore, in a linear guide apparatus having dust seals made of rubber which are attached to opposite ends of the slider, friction will cause the smooth sliding of the slider to be disturbed, and in addition, perfect dust-proof properties cannot be achieved.

Accordingly, in order to prevent the attaching or deposition of foreign particles and also to reduce operational resistance, the guide rail 3 has been covered by a dust-proof cover.

As a prior art dust-proof cover of this type, a bellows as shown in FIGS. 11 through 13 is known. This bellows 6 is made of synthetic rubber, and when used as a bellow 6A for covering an end of the guide rail 3, one end is fixed to an end face 3a of the guide rail 3 with screws 7 and the other end is fixed to an end face 4a of the slider 4 with screws 8. When two sliders 4 are used for a single guide rail 3 so that a member W to be driven is supported commonly by the two sliders 4, as shown in FIG. 11, an intermediate bellow 6B is used to prevent dust from entering between the two sliders 4. In this case, one end of the intermediate bellow 6B is fixed to one slider and the other end of the intermediate bellow 6B is fixed to the other slider.

Another type of prior art dust-proof cover is a telescopic cover consisting of a plurality of barrel members made of a sheet material. Each barrel member can be drawn from or inserted into another so that the total length may be extended or shortened. In this case, since each barrel member covers the guide rail by its three walls, including the upper wall and both side walls, the remaining bottom wall is open as in the case of the bellow.

The prior art dust-proof covers of linear guides involve the following problems.

In the bellows type, the mechanical strength and the are insufficient. Furthermore, a considerably large space is required.

In the telescopic type, in the case of a large slider, a bearing is used to make the extending and contracting operations smooth. Accordingly, the manufacturing cost is high and a large space is necessary. In the case of a small slider, since a low manufacturing cost is required, a bearing is not used for its telescopic operation. As a result, the function and characteristics inherently required for the linear guide apparatus, for example, a smooth movement with a small force and no stick-slip characteristics are sacrificed by the telescopic cover.

SUMMARY OF THE INVENTION

The present invention was made in view of the problems in the prior art, and it is an object of the invention to provide a dust-cover for a linear guide which is durable, does not require a large space, and is very smooth in its operation.

In order to achieve the above-object, a dust-proof cover for a linear guide apparatus, which apparatus includes a guide rail having a plurality of axially extending ball rolling grooves along each side, and a slider mounted for axial movement on-the guide rail through the action of rolling members interposed between the guide rail and the slider, comprises an axially extensible telescopic cover main body for covering the upper and both side surfaces of the guide rail. The telescopic cover main body has an opening in a bottom portion and side edge portions which are formed by folding lower end portions of the side walls of the cover main body inwardly so that the bottom edge portions extend axially and opposing to each other across the opening. A plurality of rolling members are held rollably by retainer wires along the inside of the bottom edge portions. The rolling members protrude inwardly into the lowermost of the ball rolling grooves of the guide rail so as to enable the telescopic cover main body to extend and to contract while being guided by the rolling members.

When the slider moves, guided by the guide rail, the telescopic cover main body extends or contracts in accordance with the movement of the slider. The rolling members provided in the telescopic cover main body roll in the lowermost ball rolling grooves along both sides of the guide rail. Accordingly, the telescopic cover main body is moved very lightly while being guided by the substantially rolling movement of the rolling members. As a result, no stick-slip action occurs, and the smooth movement required for the linear guide apparatus is not disturbed.

Moreover, since the cover is constructed so that the rolling members roll in the ball rolling grooves, the telescopic cover main body is guided smoothly in a small space. At the same time, the displacement or movement of the telescopic cover main body in the upward direction is prevented.

In addition, since the ball rolling grooves of the guide rail are utilized as the grooves for rolling of the rolling members of the telescopic cover main body, there is no need to especially work the linear guide apparatus additionally.

DESCRIPTION OF THE PREFERRED EMBODIMENTS

Figure 1:
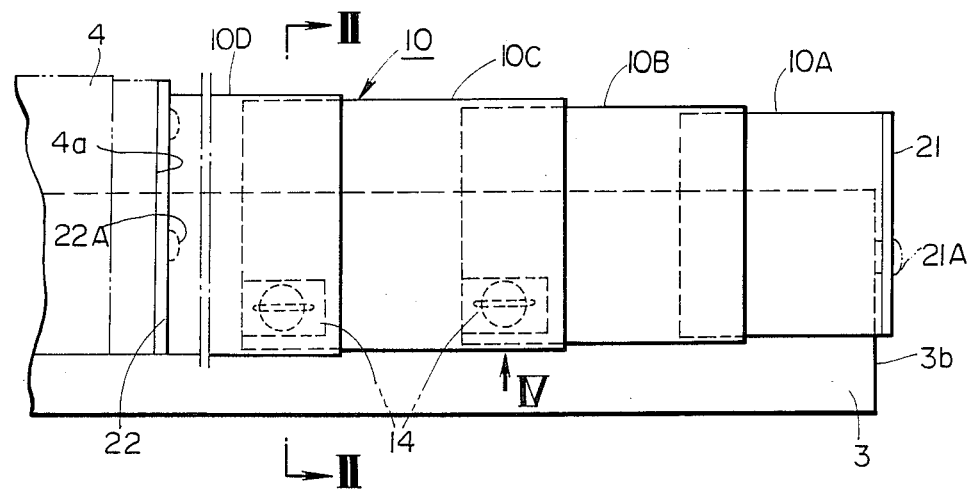
FIG. 1 is a side view of a first embodiment of the present invention.

A first embodiment of the invention will be described with reference to the drawings. Throughout the drawings like reference numerals designate like parts.

With reference to FIGS. 1 through 6, a telescopic cover main body 10 of a dust-proof cover is constituted by four cover elements 10A, 10B, 10C and 10D of hollow-square configuration. Each element is of a slightly different size, from large to small, so that they are insertable into and drawable from one another. Each of the cover elements 10A, 10B, 10C and 10D is formed, for example, by bending sheet steel in a hollow-square shape. One of the four walls, shown in FIG. 2 as the bottom wall, is opened with both side edge portions 11 protruding inwardly at right angles from the lower edges of both side walls. Where the mechanical strength of the cover main body 10 is not critical, it may be constructed of a light plastic material.

Figure 3:
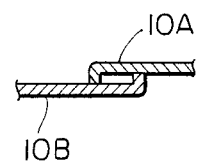
FIG. 3 is a longitudinal sectional view showing a structure for a draw-out stopper.

Each of the side edge portions 11 is formed to be located at a position, when the telescopic cover main body 10 is assembled to a linear guide apparatus, below a lower ball rolling groove 2B of an upper and a lower ball rolling groove 2A and 2B of the guide rail 3. An axially-inward end portion of the cover element 10A and an axially-outward end portion of the cover element 10B, into which the cover element part 10A is inserted, are formed with draw-stoppers as shown in FIG. 3. The draw-stoppers are formed by bending the end portions respectively outwardly and inwardly, with respect to the axis of the cover main body 10, so that both the bent portions engage in a face-to-face relationship with each other when the elements are fully extended with relation to each other. The draw-stoppers are also formed at corresponding end portions of the cover elements 10B and 10C, and at corresponding end portions of the cover elements 10C and 10D.

Figure 2:
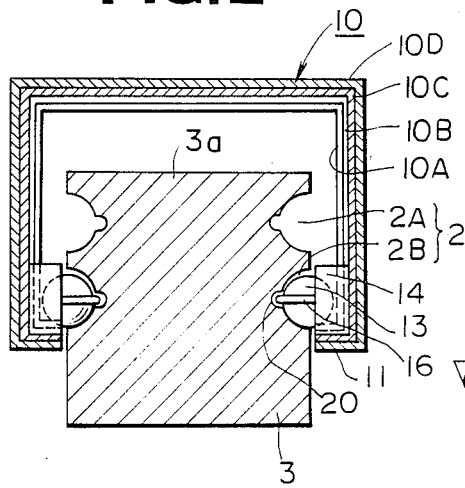
FIG. 2 is a sectional view taken along the line II—II of FIG. 1.

At axially inside-corners, see FIG. 1, of the side edge portions 11 of the cover elements 10B and 10C, sphere members 13 which constitute rolling members are provided. A pair of right and left sphere members, as shown in FIG. 2, are provided at each axial position. In each of the cover elements 10B and 10C, the pair of sphere members 13 protrude inwardly so that they fit into the lower ball rolling grooves 2B along both sides of the guide rail 3.

Figure 4:
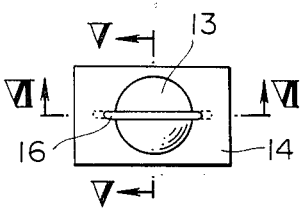
FIG. 4 is a plan view of a sphere member mounting structure as viewed along the arrow IV of FIG. 1.
Figure 5:
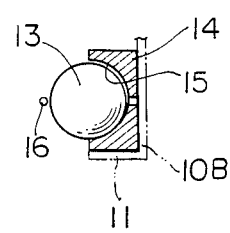
FIG. 5 is a sectional view taken along the line V—V of FIG. 4.
Figure 6:
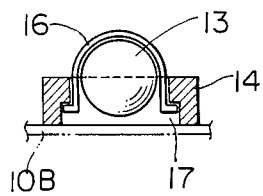
FIG. 6 is a sectional view taken along the line VI—VI of FIG. 4.

FIGS. 4 through 6 shown an example of a holding structure for the sphere member 13. Specifically, a block member 14 of a rigid material, such as plastic, steel, or the like is formed with a half-sphere-shape recess 15 and a wire fixing space 17. In the wire fixing space 17, a U-shaped retainer wire 16 having opposite ends bent outwardly is fixed. The sphere member 13 is accommodated in the recess 15 and embraced by the retainer wire 16. The block member 14 may be formed in two parts which are joined integrally and which correspond to halves obtained by dividing the block member 14 at the center thereof. The block 14 is bonded or welded to each axial inside corner of the side edge portions 11 of the cover elements 10B and 10C.

When the telescopic cover main body 10 is mounted in the guide rail 3, the retainer wire 16 is accommodated in a retainer escape channel 20 of the lower ball rolling groove 2B, allowing the sphere member 13 to roll freely in the ball rolling groove 2B which serves as a rolling surface.

Figure 7:
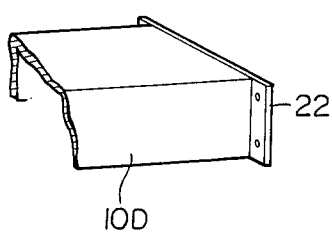
FIG. 7 is a partial perspective view showing an example of a mounting structure of a dust-proof cover main body on a slider of a linear guide apparatus.

An end of the cover element 10A which is an end element part of the telescopic cover main body 10 is closed by an attaching plate 21 secured integrally to the cover element part 10A. The attaching plate 21 is also fixed to end face 3b of guide rail 3 by a screw 21A utilizing a tap formed in the end face 3b. Furthermore, an attaching edge plate 22, shown in FIG. 7, is secured integrally to an end of the cover element 10D. Similarly, this attaching edge plate 22 is fixed to an end face 4a of the slider 4 by a screw 22A.

Figure 8:
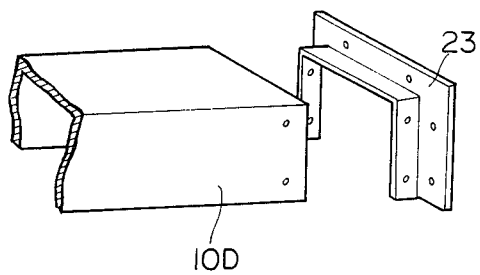
FIG. 8 is a partial perspective view showing another example similar to FIG. 7.

In this case, if a dust-proof cover attaching member 23, as shown in FIG. 8, is fixed to the end face 4a of the slider 4 beforehand, there will be no need to form the attaching edge plate 22 at the end of the cover element 10D.

Figure 9:
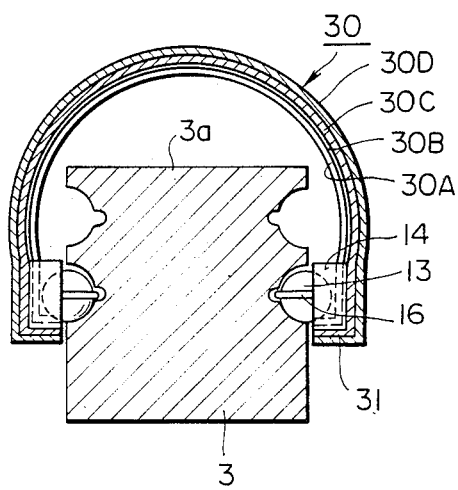
FIG. 9 is a cross sectional view of a second embodiment of the invention.
Figure 10:
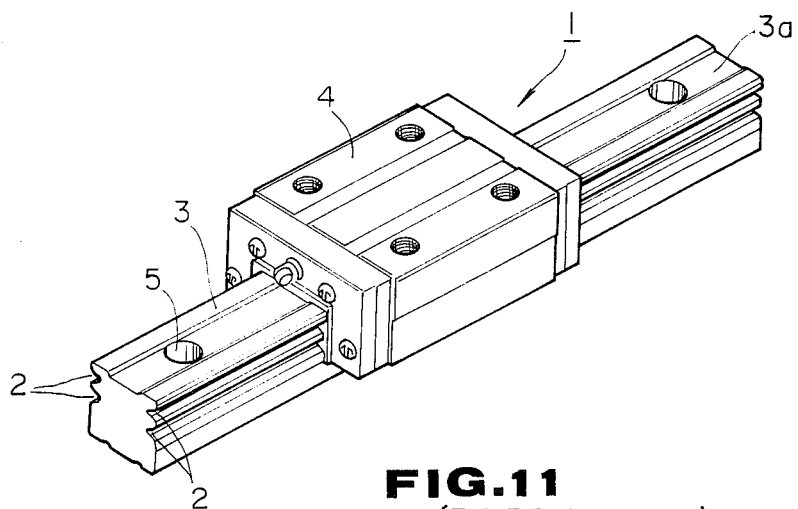
FIG. 10 is a perspective view of an example of a prior art linear guide apparatus.

In a second embodiment, shown in FIG. 9, a telescopic cover main body 30 is formed in a substantially U-shape. Accordingly, each of cover elements 30A, 30B, 30C and 30D is formed by curving a sheet material and bending the lower portions of both side walls inwardly at substantially right angles to form side edge portions 31. Thus, a bottom portion of each cover element part is open with the exception of the side edge portions 31. A sphere member 13 is held at each of the inside corners of the side edge portions 31, by a block member 14 and a retainer wire 16 in a similar manner as shown in FIGS. 1 through 6.

By forming the telescopic cover main body 30 in a U-shape, the space required for mounting can be reduced as compared with the square type telescopic cover main body 10. Furthermore, the extension and contraction of the telescopic cover main body 30 can be performed more smoothly. In addition, an advantage is provided in that the U-shaped telescopic cover main body 30 is not easily deformed by an external force imparted thereto.

Figure 11:
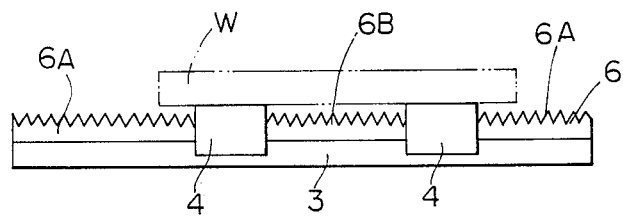
FIG. 11 is a schematic side view of a prior art dust-proof cover.
Figure 12:
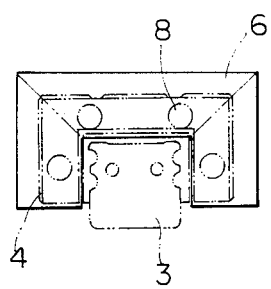
FIG. 12 is a front view of a prior art dust-proof cover showing a mounting condition thereof.
Figure 13:
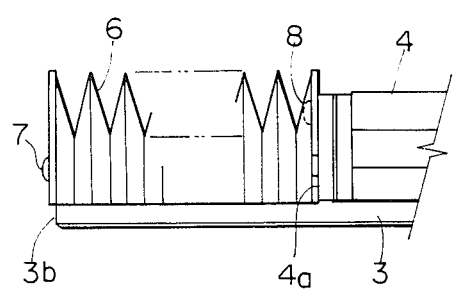
FIG. 13 is a side view of the prior art dust-proof cover.

While each of the above embodiments is described as to the case in which only one slider 4 is used in the linear guide apparatus, it is also applicable to a linear guide apparatus having a plurality of sliders. In this case, the telescopic cover main body can be connected at an intermediate position as in the prior art intermediate bellow, shown in FIG. 11.

Furthermore, in the embodiments described above, although the telescopic cover main bodies 10 and 30 have four cover elements, the present invention is not limited to this and the number of cover elements utilized may be selected in accordance with the specification of individual linear guide apparatus.

As described in the foregoing, in the present invention, the rolling members held rollably by block members at the inside lower corners of the telescopic cover main body elements roll under the weight of the cover, guided by tee ball rolling grooves already existing in the guide rail of the linear guide apparatus. Accordingly, the following advantages are obtained.

The telescopic cover main body can move very smoothly due to the rolling movement of the rolling members.

Since the telescopic cover main body can extend and contract without repeated bending and folding, durability is improved.

There is no need to work the existing guide rail additionally, and hence the dust-proof cover can be manufactured at low cost.

The dust-proof cover is compact and requires no large space, and further, the upward movement of the telescopic cover main body is prevented.

Furthermore, since each of the rolling members is retained by the retainer wire to the block member, the rolling member will not fall off the block member when the dust-proof cover is assembled to or disassembled from the guide rail.

While certain embodiments of the invention have been described in detail above in relation to a dust-proof cover for linear guide, it will be apparent to those skilled in the art that the disclosed embodiment may be modified. Therefore, the foregoing description is to be considered exemplary rather than limiting, and the true scope of the invention is that defined in the following claims.

What is claimed is:

1. A dust-proof cover for a guide rail of a linear guide apparatus including a guide rail having a plurality of axially extending ball rolling grooves in each of both side surfaces, and a slider mounted on said guide rail, for movement in the axial direction, through rolling members inserted between said slider and said guide rail, said dust-proof cover comprising:

a telescopic cover main body, having an upper surface and downwardly extending side walls, covering an upper surface and said plurality of ball rolling grooves of each side surface of said guide rail, said telescopic cover main body extensible and contractible in said axial direction and having an open bottom portion with axially extending side edge portions along both sides of the open bottom portion formed by bending the lower end portions of said downwardly extending side walls of said telescopic cover main body inwardly; and a plurality of rolling members, each said side edge portions and protruding into one of said plurality of ball rolling grooves, positioned at a lower side to be fitted thereinto, thereby to allow said telescopic cover main body to extend and contract while guided by said rolling members rolling in said ball rolling grooves.

2. A dust-proof cover according to claim 1, wherein each of said rolling members is retained to a block member, fixedly attached to said inside of said side edge portions, by said retainer wire.

* * * * *